United States Patent
Kapoor (10) Patent No.: US 10,162,754 B2
(45) Date of Patent: Dec. 25, 2018

(54) LATERAL CAST OUT OF CACHE MEMORY

(71) Applicant: International Business Machines Corporation, Armonk, NY (US)

(72) Inventor: Shakti Kapoor, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 151 days.

(21) Appl. No.: 15/063,713

(22) Filed: Mar. 8, 2016

(65) Prior Publication Data

US 2017/0262370 A1 Sep. 14, 2017

(51) Int. Cl.
*G06F 12/00* (2006.01)
*G06F 12/0811* (2016.01)

(52) U.S. Cl.
CPC .... *G06F 12/0811* (2013.01); *G06F 2212/283* (2013.01)

(58) Field of Classification Search
CPC ........................ G06F 12/0811; G06F 2212/283
See application file for complete search history.

(56) References Cited

U.S. PATENT DOCUMENTS

| | | | |
|---|---|---|---|
| 5,751,992 A | 5/1998 | Bhargava et al. | |
| 6,378,044 B1 | 4/2002 | Luce et al. | |
| 6,687,765 B2 * | 2/2004 | Surugucchi | G06F 3/0605 710/15 |
| 6,715,040 B2 * | 3/2004 | Wang | G06F 12/0804 711/133 |
| 7,836,257 B2 | 11/2010 | Dorsey et al. | |
| 8,327,073 B2 | 12/2012 | Guthrie et al. | |
| 2010/0030970 A1* | 2/2010 | Qureshi | G06F 12/0802 711/128 |
| 2010/0262778 A1* | 10/2010 | Cargnoni | G06F 12/0811 711/118 |
| 2010/0262782 A1* | 10/2010 | Guthrie | G06F 12/0811 711/122 |
| 2015/0127909 A1 | 5/2015 | Ghai et al. | |

OTHER PUBLICATIONS

Disclosed Anonymously, Cache Memory with Configurable Line Size, IPCOM000157030D, Aug. 10, 2007, 7 pages.
Funk, et al., Of NUMA on POWER7 in IBMi, IBM, Jan. 2010, 16 pages.
Levine, et al., Off Chip L2 Lateral Cache Miss Counting, Sep. 1994, IBM TDB, 37(9), 3 pages.

* cited by examiner

*Primary Examiner* — Kalpit Parikh
(74) *Attorney, Agent, or Firm* — Cantor Colburn LLP (57) ABSTRACT

An aspect includes a method of lateral cast out in a cache memory system. The method includes configuring one or more cache memories of the cache memory system as lateral cast out receiving cache memories. A stress test mode of the cache memory system is enabled. One or more cache lines of a lateral cast out source cache memory of the cache memory system are cast out. At least one of the one or more cache lines from the lateral cast out source cache memory is accepted into at least one of the lateral cast out receiving cache memories based on the stress test mode being enabled.

12 Claims, 4 Drawing Sheets

LATERAL CAST OUT OF CACHE MEMORY

BACKGROUND

The present invention relates to computer memory systems, and more specifically, to lateral cast out of cache memory of a processor in a computer system.

In some computer systems, cache memory can increase instruction and data processing throughput, but cache memory can be difficult to test. Validation and verification processes during cache memory system development can apply traffic to cache memory to confirm that the cache memory is operating as expected. Cache memory may be readily accessible to test equipment during early stages of cache memory system development. However, when the cache memory is incorporated within a device, such as a processor, verification and validation become more challenging in a post-silicon phase of processor development.

SUMMARY

According to one embodiment, a method of lateral cast out in a cache memory system is provided. The method includes configuring one or more cache memories of the cache memory system as lateral cast out receiving cache memories. A stress test mode of the cache memory system is enabled. One or more cache lines of a lateral cast out source cache memory of the cache memory system are cast out. At least one of the one or more cache lines from the lateral cast out source cache memory is accepted into at least one of the lateral cast out receiving cache memories based on the stress test mode being enabled.

According to another embodiment, a cache memory system includes a plurality of cache memories and a cache manager. The cache manager configures one or more of the cache memories as lateral cast out receiving cache memories. A stress test mode of the cache memory system is enabled. One or more cache lines of a lateral cast out source cache memory of the cache memory system are cast out. At least one of the one or more cache lines is accepted from the lateral cast out source cache memory into at least one of the lateral cast out receiving cache memories based on the stress test mode being enabled.

According to yet another embodiment, a computer program product for lateral cast out in a cache memory system is provided. The computer program product includes a computer readable storage medium having program instructions embodied therewith. The program instructions are executable by processing circuitry to cause the processing circuitry to configure one or more cache memories of the cache memory system as lateral cast out receiving cache memories. A stress test mode of the cache memory system is enabled. One or more cache lines of a lateral cast out source cache memory of the cache memory system are cast out. At least one of the one or more cache lines from the lateral cast out source cache memory is accepted into at least one of the lateral cast out receiving cache memories based on the stress test mode being enabled.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Embodiments described herein are directed to lateral cast out of cache memory in a computer system. Embodiments assist in validating coherency and replacement algorithms of the cache memory as part of a stress testing process. Lateral cast out refers to eviction of one or more cache lines to a receiving cache memory at a same level in a cache memory hierarchy. For example, level-three (L3) cache contents of one processor core may be sent (i.e., laterally cast out) to another L3 cache of a different processor core instead of sending the line to the memory. Level-two (L2) cache contents that are cast out can be sent to the L3 cache of the same processor core. Embodiments provide a stress test mode that can be enabled, for example, as part of a built-in self-test process to verify the lateral cast out capabilities to cache memory. Lateral cast out from a cache memory can be managed on a line basis and/or a congruence class basis, where each cache memory can include multiple cache lines per congruence class. For instance, a cache memory associated with a processor core can include multiple entries of congruence classes, where each congruence class includes multiple cache lines (e.g., eight cache lines of 128 bytes each per congruence class).

In embodiments, cache lines in a receiving cache memory can be marked to receive a lateral cast out cache line or congruence class. The receiving cache memory may accept a lateral cast out based on determining that cache misses are below a threshold value. Acceptance of lateral cast outs can be configured on a per cache memory basis as part of a stress test mode. For instance, each cache memory of the cache memory system may be configured as required to accept a lateral cast out or required to not accept a lateral cast out. The stress test mode of cache memory system operation can expand lateral cast outs to include randomly selected line and/or congruence classes beyond those required to be cast out.

Figure 1:
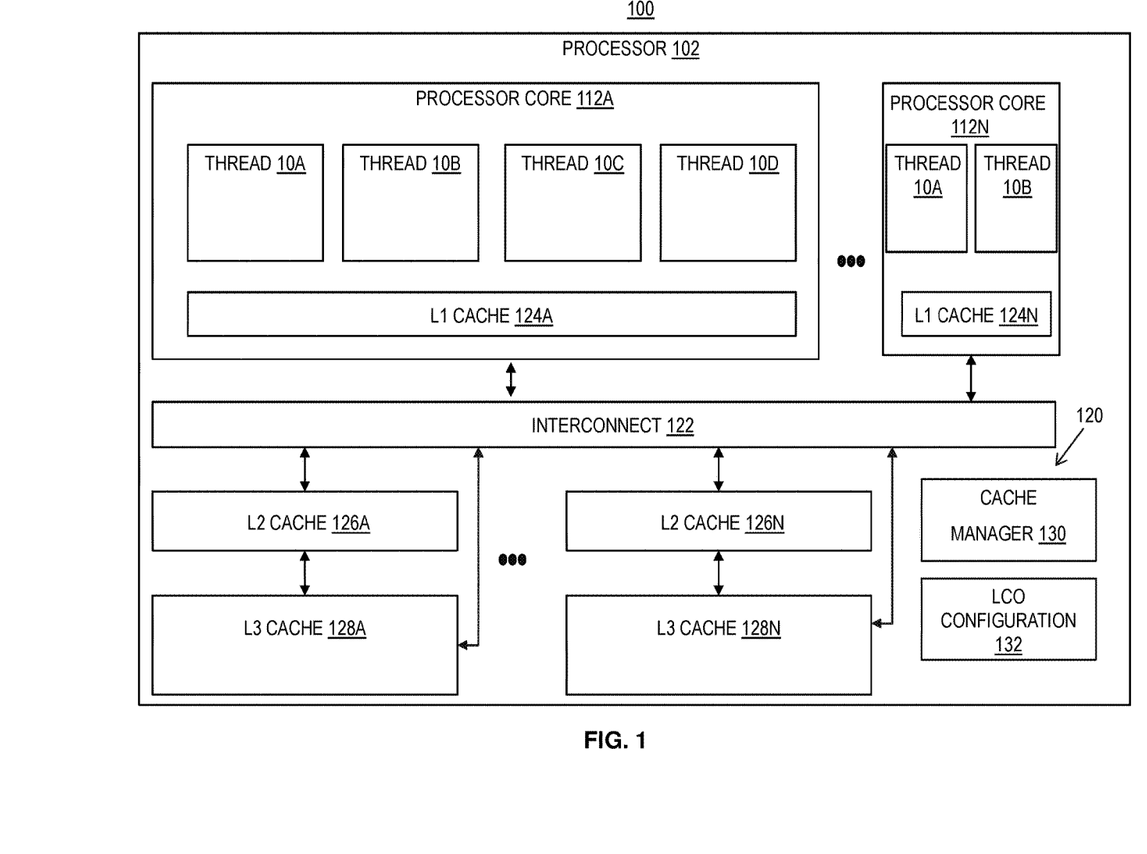
FIG. 1 is a block diagram of an exemplary processing system according to embodiments.

FIG. 1 illustrates a block diagram of a processing system 100 that can include one or more instances of a processor 102. FIG. 1 depicts a plurality of processor cores 112A through 112N (generally referred to as processor cores 112 on one processor die or processor 102, connected with an interconnect 122, under management of an interconnect control (not shown). Each processor core 112A-N may have an instruction cache for caching instructions from memory to be executed and a data cache for caching data (operands) of memory locations to be operated on by the processor core 112, which are depicted generally as L1 cache 124A-N. It is understood that the processor cores 112A-N are physical devices that include all the circuitry (i.e., hardware along with firmware) necessary to execute instructions as understood by one skilled in the art. Although the processor 102 may include multiple processor cores 112A-N, various examples may be provided with reference to processor core 112A and processor core 112N for ease of understanding and not limitation. Thus, the processor 102 includes any combination of two or more processor cores 112. It is understood that further details shown and discussed relative to processor core 112A apply by analogy to all processor cores 112, and these details may be included in all of the processor cores 112.

The processor core 112A is shown with four threads 10A, 10B, 10C, and 10D (generally referred to as thread or threads 10), and each thread 10A-10D includes a separate sequence of instructions or instruction streams, such as a program or portion thereof. Each processor core 112A-112N may be configured to support different levels of simultaneous multi-threaded (SMT) operation, i.e., a different number of threads 10. In the example of FIG. 1, processor core 112A is in SMT-4 mode, meaning that four threads 10A-10D are configured to execute in parallel, while processor core 112N is in SMT-2 mode with threads 10A and 10B. A processor core 112 may be configured in a single thread mode or a higher order mode with a higher number of threads depending upon implementation.

At an architecture level, each thread 10 may represent an independent central processing unit (CPU). Instructions which the thread 10 has for execution by the processor core 112 can include a number of instruction classes, such as: general, decimal, floating-point-support (FPS), binary-floating-point (BFP), decimal-floating-point (DFP), hexadecimal-floating-point (HFP), control, and I/O instructions. The general instructions can be used in performing binary-integer arithmetic operations and logical, branching, and other non-arithmetic operations. The decimal instructions operate on data in decimal format. The BFP, DFP, and HFP instructions operate on data in BFP, DFP, and HFP formats, respectively, while the FPS instructions operate on floating-point data independent of the format or convert from one format to another. To achieve higher throughput, various resource units of each processor core 112 are accessed in parallel by executing one or more of the instructions in a thread 10 using a processing pipeline.

Regardless of the number of threads 10 configured in each of the processor cores 112A-N, cache memory resources can be managed on a processor core basis. For instance, a cache memory system 120 of the processor 102 includes L1 cache 124A-N, L2 cache 126A-N, and L3 cache 128A-N. L1 cache 124A, L2 cache 126A, and L3 cache 128A form a cache hierarchy for processor core 112A. Similarly, L1 cache 124N, L2 cache 126N, and L3 cache 128N form a cache hierarchy for processor core 112N. Cache manager 130 manages movement of cache lines and congruence classes between cache memories of the cache memory system 120. A lateral cast out configuration register 132 can be used to configure the cache manager 130 into a stress test mode that can include a number of stress tests to verify and validate not only that data can be promoted and demoted through a cache hierarchy associated with a particular processor core 112 but can also automate testing of lateral cast out operations across cache memories at a same level that are associated with different processor cores 112A-N.

Figure 2:
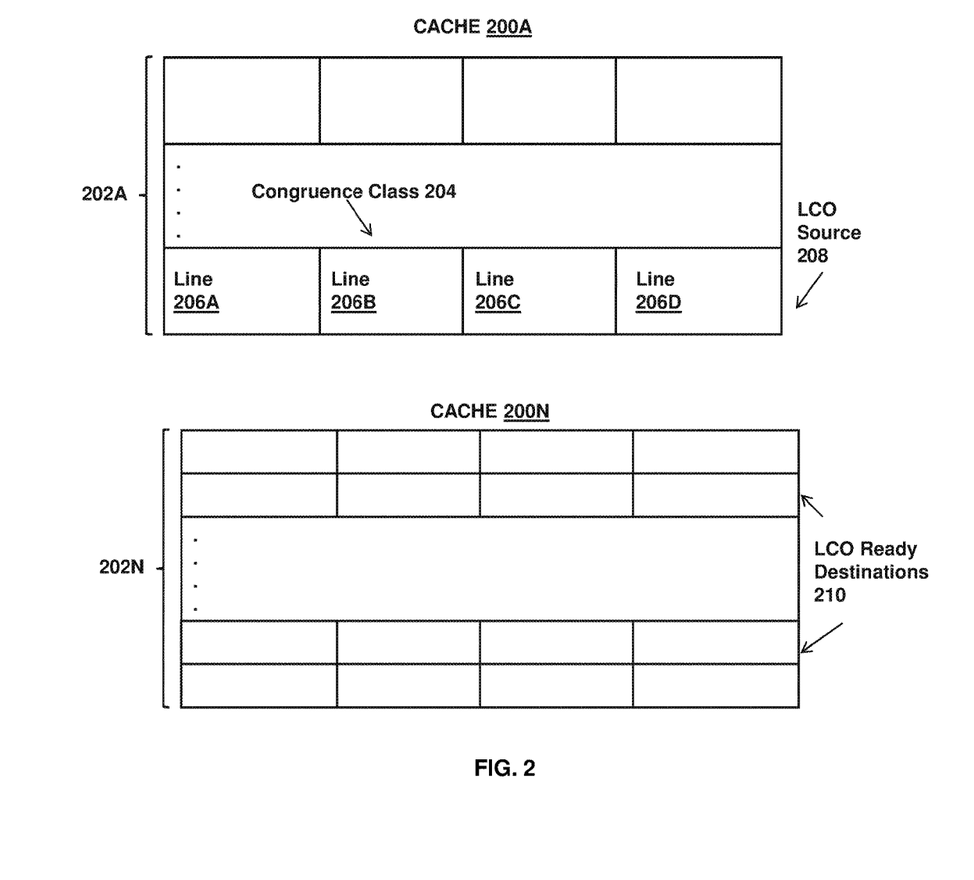
FIG. 2 is a block diagram of a cache configuration according to an embodiment.

FIG. 2 is a block diagram of cache memories 200A and 200N as examples of two cache memories within the processor 102 of FIG. 1 operating at a same cache level, such as L3 cache 128A and 128N. Cache memory 200A in the example of FIG. 2 is a lateral cast out source cache memory of the cache memory system 120 of FIG. 1, while cache memory 200N is an example of a lateral cast out receiving cache memory of the cache memory system 120 of FIG. 1. While only two cache memories 200A and 200N are depicted, there can be any number of cache memories 200 operable to support lateral cast out operations at a same level in the cache memory hierarchy. For instance, there may be twelve L3 caches 128 within processor 102, where six can be configured to accept lateral cast outs and six can be configured to not accept lateral cast outs. Alternatively, the cache manager 130 of FIG. 1 can be configured with any combination of cache memories enabled to accept lateral cast outs.

In the example of FIG. 2, cache memory 200A includes a plurality of entries 202A that can be organized into congruence classes 204, where each congruence class 204 includes a plurality of cache lines 206. For instance, there may be four cache lines 206 (cache line 206A, 206B, 206C, and 206D) in each congruence class 204. The cache manager 130 of FIG. 1 can mark one or more cache lines 206A-D as a lateral cast out source cache memory 208. When the stress test mode is enabled, the lateral cast out source cache memory 208 is made available to be accepted by another cache memory, such as cache memory 200N. The cache memory 200N also includes a plurality of entries 202N. The cache manager 130 of FIG. 1 can flag one or more cache lines and/or congruence classes of cache memory 200N as lateral cast out ready destinations 210, where cache memory 200N is configured as a lateral cast out receiving cache memory. Lateral cast out ready destinations 210 can be identified by tracking the utilization of the entries 202N within the cache memory 200N to ensure that least recently used entries, for example, are selected for receiving lateral cast outs. Alternate schemes of aging, cache miss tracking, and other thresholds can be used to identify whether particular entries 202N in cache memory 200N are flagged as lateral cast out ready destinations 210. The cache manager 130 may support a variety of configurations to further stress the cache memory system 120 of FIG. 1, such as randomly selecting at least one of the cache lines 206A-D to cast out and/or randomly selecting one or more congruence classes 204 to cast out. In some embodiments, when multiple cache memories 200, such as cache memory 200N, are enabled to accept lateral cast outs and have lateral cast out ready destinations 210 available, the first lateral cast out receiving cache memory that observes a lateral cast out request accepts it.

Figure 3:
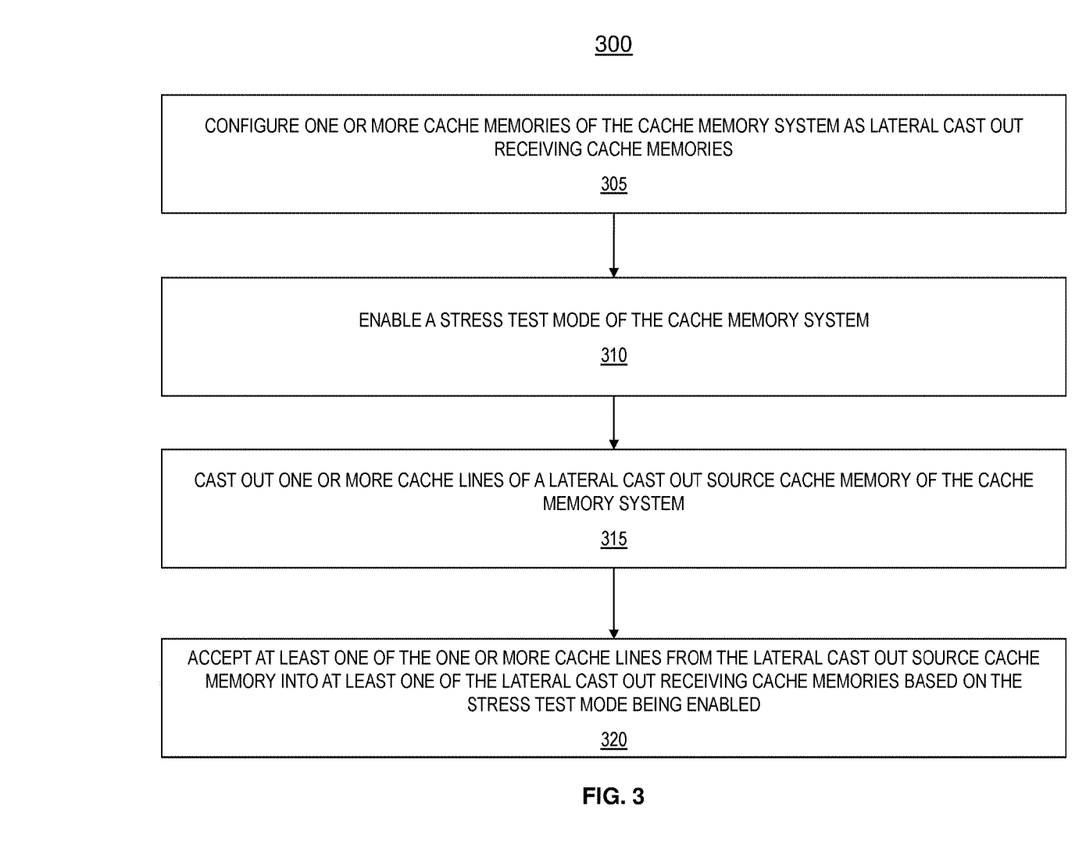
FIG. 3 is a process flow according to an embodiment.

FIG. 3 is a process flow of a method 300 according to an embodiment. The method 300 can be performed by various elements of the system 100 of FIG. 1, such as the cache manager 130 within processor 102 of FIG. 1, and is described in reference to FIGS. 1-3. Although a particular order of blocks is depicted and described with respect to FIG. 3, it will be understood that the order can be changed, and the blocks may be combined or further subdivided. For purposes of explanation, the method 300 is described with respect to the processor 102 of FIG. 1.

At block 305, the cache manager 130 configures one or more cache memories of the cache memory system 120 as lateral cast out receiving cache memories. Each of the lateral cast out receiving cache memories can be associated with a different processor core 112 within processor 102. Two or more of the cache memories can be configurable between always accepting lateral cast outs and never accepting lateral cast outs. For example, settings in the lateral cast out configuration register 132 may define four of the L3 caches 128A-N as required to always accept lateral cast outs while defining other instances of the L3 caches 128A-N as never accepting lateral cast outs. The configuration assignments in the lateral cast out configuration register 132 can change during a test procedure to check a variety of test cases.

At block 310, the cache manager 130 enables a stress test mode of the cache memory system 120. While the stress test mode is active, a number of fixed and/or random lateral cast out patterns can be applied to test the capability of the cache memory system 120 to handle a variety of higher stress scenarios, such as a higher than expected rate of lateral cast out requests as compared to nominal operating conditions.

At block 315, the cache manager 130 casts out one or more cache lines 206 of a lateral cast out source cache memory (e.g., cache memory 200A) of the cache memory system 120. The lateral cast out source cache memory and the lateral cast out receiving cache memories can be level-3 caches associated with different processor cores 112 within the processor 102. Stress testing can include randomly selecting at least one of the one or more cache lines 206 to laterally cast out. Two or more of the cache lines 206 can be grouped into congruence classes 204, and the cache manager 130 may randomly select one or more of the congruence classes 204 to cast out from the lateral cast out source cache memory as part of the stress test.

At block 320, at least one of the one or more cache 206 lines from the lateral cast out source cache memory are accepted into at least one of the lateral cast out receiving cache memories based on the stress test mode being enabled. A first one of the lateral cast out receiving cache memories that observes a lateral cast out request can accept at least one of the one or more cache lines 206 from the lateral cast out source cache memory.

Figure 4:
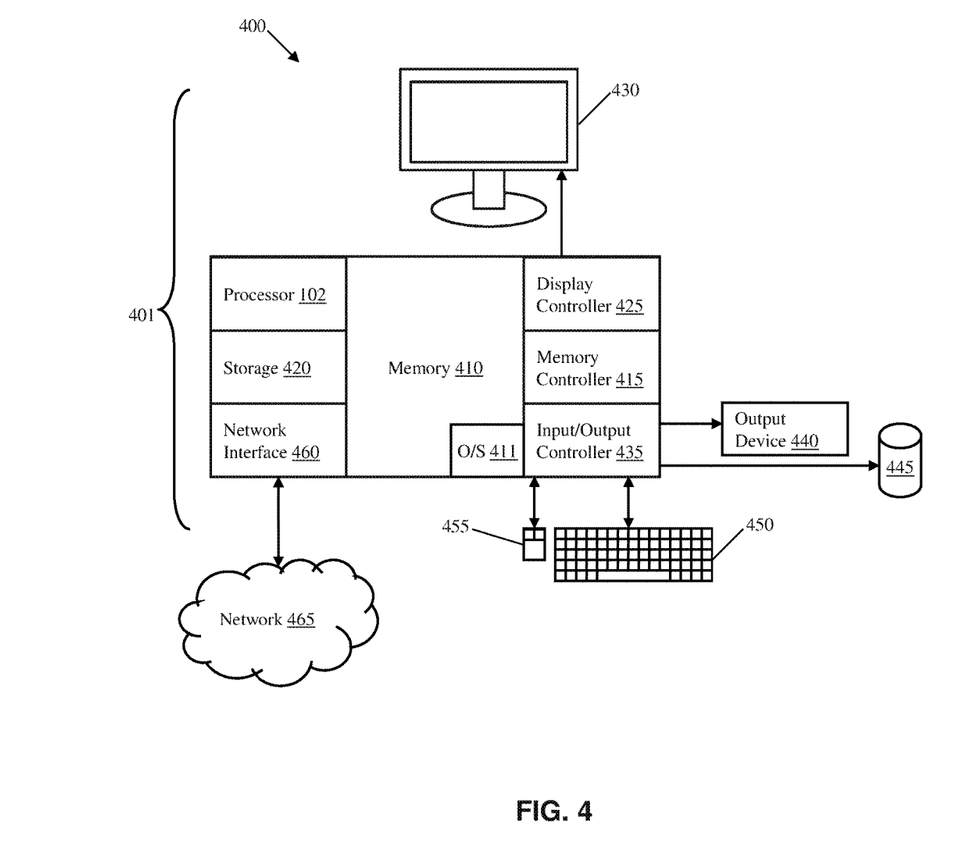
FIG. 4 is block diagram of a processing system according to an embodiment.

FIG. 4 depicts a block diagram of a system 400 for lateral cast out of cache memory in processor 102 of FIG. 1. The methods described herein can be implemented in hardware, software (e.g., firmware), or a combination thereof. In an exemplary embodiment, the methods described herein are implemented in hardware as part of the microprocessor of a computer, such as a personal computer, workstation, minicomputer, or mainframe computer. The system 400 therefore includes computer 401 as illustrated in FIG. 4.

In an exemplary embodiment, in terms of hardware architecture, as shown in FIG. 4, the computer 401 includes processor 102 of FIG. 1 that is operable to perform lateral cast out of cache memory. The computer 401 further includes memory 410 (e.g., main memory) coupled to a memory controller 415, and one or more input and/or output (I/O) devices 440, 445 (or peripherals) that are communicatively coupled via a local input/output controller 435. The input/output controller 435 can be, for example but not limited to, one or more buses or other wired or wireless connections, as is known in the art. The input/output controller 435 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 102 is a hardware device for executing software, particularly that stored in storage 420, such as cache storage, or memory 410. The processor 102 can be any custom made or commercially available processor, a central processing unit (CPU), an auxiliary processor among several processors associated with the computer 401, a semiconductor based microprocessor (in the form of a microchip or chip set), a macroprocessor, or generally any device for executing instructions.

The memory 410 can include any one or combination of volatile memory elements (e.g., random access memory (RAM, such as DRAM, SRAM, SDRAM, etc.)) and non-volatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 410 may incorporate electronic, magnetic, optical, and/or other types of storage media. Note that the memory 410 can have a distributed architecture, where various components are situated remote from one another, but can be accessed by the processor 102.

The instructions in memory 410 may include one or more separate programs, each of which comprises an ordered listing of executable instructions for implementing logical functions. In the example of FIG. 4, the instructions in the memory 410 can include a suitable operating system (OS) 411. The operating system 411 essentially controls the execution of other computer programs and provides scheduling, input-output control, file and data management, memory management, and communication control and related services.

In an exemplary embodiment, a conventional keyboard 450 and mouse 455 can be coupled to the input/output controller 435. Other output devices such as the I/O devices 440, 445 may include input devices, for example but not limited to a printer, a scanner, microphone, and the like. Finally, the I/O devices 440, 445 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 400 can further include a display controller 425 coupled to a display 430. In an exemplary embodiment, the system 400 can further include a network interface 460 for coupling to a network 465. The network 465 can be an IP-based network for communication between the computer 401 and any external server, client and the like via a broadband connection. The network 465 transmits and receives data between the computer 401 and external systems. In an exemplary embodiment, network 465 can be a managed IP network administered by a service provider. The network 465 may be implemented in a wireless fashion, e.g., using wireless protocols and technologies, such as WiFi, WiMax, etc. The network 465 can also be a packet-switched network such as a local area network, wide area network, metropolitan area network, Internet network, or other similar type of network environment. The network 465 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 401 is a PC, workstation, intelligent device or the like, the instructions in the memory 410 may further include a basic input output system (BIOS) (omitted for simplicity). The BIOS is a set of essential software routines that initialize and test hardware at startup, start the OS 411, and support the transfer of data among the hardware devices. The BIOS is stored in ROM so that the BIOS can be executed when the computer 401 is activated. BIOS or other instructions in memory 410 or storage 420 may trigger and manage execution of a stress test mode as part of a built-in self-test process.

When the computer 401 is in operation, the processor 102 is configured to fetch and execute instructions stored within the memory 410, to communicate data to and from the memory 410, and to generally control operations of the computer 401 pursuant to the instructions.

In an exemplary embodiment, where the cache manager 130 of FIG. 1 is implemented in hardware, the methods described herein, such as method 300 of FIG. 3, can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Technical effects and benefits include automated built-in self-test capability within a processing system to perform stress testing of a cache memory using lateral cast outs between cache memories at a same level, for instance, as associated with different processor cores in the same processor.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of lateral cast out in a cache memory system, the method comprising:
    configuring one or more cache memories of the cache memory system as lateral cast out receiving cache memories;
    enabling a stress test mode of the cache memory system as part of a built-in self-test process to verify lateral cast out capabilities at a same level in a cache memory hierarchy of the cache memory system;
    selecting one or more cache lines to cast out based on a fixed lateral cast out pattern;
    randomly selecting one or more cache lines to cast out as a random lateral cast out pattern;
    casting out two or more cache lines of a lateral cast out source cache memory of the cache memory system based on the fixed lateral cast out pattern and the random lateral cast out pattern; and
    accepting at least one of the two or more cache lines cast out from the lateral cast out source cache memory into at least one of the lateral cast out receiving cache memories based on the stress test mode being enabled, wherein each of the lateral cast out receiving cache memories is associated with a different core within a processor and wherein two or more of the cache memories are reconfigurable between always accepting lateral cast outs and never accepting lateral cast outs responsive to changing one or more settings in a lateral cast out configuration register of the processor during the built-in self-test process.

2. The method according to claim 1, wherein the lateral cast out source cache memory and the lateral cast out receiving cache memories are level-3 caches associated with different cores within the processor.

3. The method according to claim 1, wherein two or more of the cache lines are grouped into congruence classes and further comprising:
    randomly selecting one or more of the congruence classes to cast out from the lateral cast out source cache memory.

4. The method according to claim 1, wherein a first one of the lateral cast out receiving cache memories that observes a lateral cast out request accepts at least one of the one or more cache lines from the lateral cast out source cache memory.

5. A cache memory system comprising:
    a plurality of cache memories; and
    a cache manager configured to perform:
        configuring one or more of the cache memories as lateral cast out receiving cache memories;
        enabling a stress test mode of the cache memory system as part of a built-in self-test process to verify lateral cast out capabilities at a same level in a cache memory hierarchy of the cache memory system;
        selecting one or more cache lines to cast out based on a fixed lateral cast out pattern;
        randomly selecting one or more cache lines to cast out as a random lateral cast out pattern;
        casting out two or more cache lines of a lateral cast out source cache memory of the cache memory system based on the fixed lateral cast out pattern and the random lateral cast out pattern; and
        accepting at least one of the two or more cache lines cast out from the lateral cast out source cache memory into at least one of the lateral cast out receiving cache memories based on the stress test mode being enabled, wherein each of the lateral cast out receiving cache memories is associated with a different core within a processor and wherein two or more of the cache memories are reconfigurable between always accepting lateral cast outs and never accepting lateral cast outs responsive to changing one or more settings in a lateral cast out configuration register of the processor during the built-in self-test process.

6. The cache memory system according to claim 5, wherein the lateral cast out source cache memory and the lateral cast out receiving cache memories are level-3 caches associated with different cores within the processor.

7. The cache memory system according to claim 5, wherein two or more of the cache lines are grouped into congruence classes and the cache manager is further configured to perform:

randomly selecting one or more of the congruence classes to cast out from the lateral cast out source cache memory.

8. The cache memory system according to claim 5, wherein a first one of the lateral cast out receiving cache memories that observes a lateral cast out request accepts at least one of the one or more cache lines from the lateral cast out source cache memory.

9. A computer program product for lateral cast out in a cache memory system, the computer program product comprising a computer readable storage medium having program instructions embodied therewith, the program instructions executable by processing circuitry to cause the processing circuitry to:

configure one or more cache memories of the cache memory system as lateral cast out receiving cache memories;

enable a stress test mode of the cache memory system as part of a built-in self-test process to verify lateral cast out capabilities at a same level in a cache memory hierarchy of the cache memory system;

select one or more cache lines to cast out based on a fixed lateral cast out pattern;

randomly select one or more cache lines to cast out as a random lateral cast out pattern;

cast out two or more cache lines of a lateral cast out source cache memory of the cache memory system based on the fixed lateral cast out pattern and the random lateral cast out pattern; and accept at least one of the two or more cache lines cast out from the lateral cast out source cache memory into at least one of the lateral cast out receiving cache memories based on the stress test mode being enabled, wherein each of the lateral cast out receiving cache memories is associated with a different core within a processor and wherein two or more of the cache memories are reconfigurable between always accepting lateral cast outs and never accepting lateral cast outs responsive to changing one or more settings in a lateral cast out configuration register of the processor during the built-in self-test process.

10. The computer program product according to claim 9, wherein the lateral cast out source cache memory and the lateral cast out receiving cache memories are level-3 caches associated with different cores within the processor.

11. The computer program product according to claim 9, wherein two or more of the cache lines are grouped into congruence classes and the program instructions are further executable by the processing circuitry to randomly select one or more of the congruence classes to cast out from the lateral cast out source cache memory.

12. The computer program product according to claim 9, wherein a first one of the lateral cast out receiving cache memories that observes a lateral cast out request accepts at least one of the one or more cache lines from the lateral cast out source cache memory.

* * * * *